US008009330B2

(12) United States Patent
Dardikman et al.

(10) Patent No.: US 8,009,330 B2
(45) Date of Patent: Aug. 30, 2011

(54) METHOD FOR IMAGING FLEXOGRAPHIC PLATES

(75) Inventors: Shay Dardikman, Tel-Aviv (IL); Yoav Telem, Kfar-Schmaryahu (IL); Stephen H. Miller, Silver Spring, MD (US)

(73) Assignee: Eastman Kodak Company, Rochester, NY (US)

( * ) Notice: Subject to any disclaimer, the term of this patent is extended or adjusted under 35 U.S.C. 154(b) by 677 days.

(21) Appl. No.: 12/025,807

(22) Filed: Feb. 5, 2008

(65) Prior Publication Data

US 2009/0195837 A1 Aug. 6, 2009

(51) Int. Cl.
*G06K 15/00* (2006.01)

(52) U.S. Cl. ...................................... 358/3.29; 358/3.31

(58) Field of Classification Search ................. 358/3.29, 358/3.3, 3.31, 3.32, 1.18
See application file for complete search history.

(56) References Cited

U.S. PATENT DOCUMENTS

| | | | | |
|---|---|---|---|---|
| 6,954,291 | B2 * | 10/2005 | Klein et al. | 358/3.29 |
| 7,717,040 | B2 * | 5/2010 | Shishkin | 101/463.1 |
| 2003/0076538 | A1 * | 4/2003 | Whittingham et al. | 358/1.18 |

FOREIGN PATENT DOCUMENTS

| | | | |
|---|---|---|---|
| EP | 1 435 291 | A1 | 7/2004 |
| EP | 1 543 966 | A1 | 6/2005 |

* cited by examiner

*Primary Examiner* — Thomas D Lee
(74) *Attorney, Agent, or Firm* — Nelson Adrian Blish

(57) ABSTRACT

A method for reducing waste in imaging of flexographic plates comprises the steps of: receiving an electronic art file (10); displaying the file on a computer display; selecting a set of polygonal areas (11, 12) from the displayed file in response to cost calculation associated with the selection of the set of polygonal areas; automatically offering alternative polygonal areas based on automatic cost calculation analysis based on the selection of the polygonal areas; ganging the polygonal areas into a compacted slugs file (208); imaging the compacted slugs file on a flexographic imaging device to produce compacted flexographic plate (209); cutting the compacted flexographic plate according to the selection the polygonal areas into independent flexographic slug plate pieces (210); and mounting the flexographic slug plate pieces on a carrier (211) while matching the original structure of the electronic art file.

5 Claims, 5 Drawing Sheets

METHOD FOR IMAGING FLEXOGRAPHIC PLATES

FIELD OF THE INVENTION

The present invention relates to flexography printing and more specifically to methods and apparatus for reducing waste during the imaging and mounting of flexographic printing plates.

BACKGROUND OF THE INVENTION

Flexographic printing plates are relatively expensive compared to other types of plates such as those used in offset printing; therefore, flexographic printers will only use the appropriate amount of plate material necessary to transfer a graphic image. The graphic image is subsequently transferred to a substrate such as film, paper, or board, etc. Printers reduce the cost of printing when using flexographic plate material, by not using flexographic material where no graphic elements exist.

Corrugated printing is a segment of the industry wherein this practice is common. To keep manufacturing costs as low as possible, the corrugated printer will manually prepare the electronic art in a manner that maximizes material savings, while minimizing the labor cost associated with manually mounting the plates for printing.

This method is accomplished by breaking an electronic art file into smaller pieces called "slugs." The slugs are then arranged using a software application such as the Kodak TIFF Assembler Plus, to produce an arranged "slugs file." The arranged slugs file is imaged (or engraved) using a specially designed flexographic imaging device and software, to produce a flexographic plate. The flexographic plate is then cut into smaller plates called "slug plates." Each "slug plate" represents a slug. The slugs plates are then mounted for printing. The process to prepare a job using this method is described in more detail below.

During the job estimation and quotation phase of the workflow, a job planner or estimator will use an inkjet proof to evaluate which graphic elements are in close proximity to other graphic elements and can therefore grouped together onto a single slug plate. During this process, the planner or estimator is also evaluates the additional labor cost that will be incurred during the plate mounting process by breaking the file and flexographic plate into smaller pieces. Therefore, the quotation for the job reflects the optimal savings in plate material when labor to mount the plates for printing is included.

Following acceptance of the quote, a prepress operator will reference the "marked up" inkjet proof that was used during the quotation process to manually add and position registration marks in and around the elements that will make up individual slug plates. The registration marks aid in re-assembling the artwork during the plate mounting process.

The prepress operator will then output a "mounting die" which is comprised of a CAD-CAM drawing of the container (or package) shape, along with the corresponding registration marks that were placed into the electronic art file. The mounting die is typically a piece of Mylar or film that is manually positioned on an optical/video plate mounting device or pin registration mounting device. The mounting die is used as a guide to properly position the individual slug plates on a "carrier sheet."

Following output of the mounting die, the electronic art is output to a TIFF bitmap format and checked for accuracy. Following approval, the composite file is then broken into individual slug files for imaging. This is accomplished by breaking an electronic art file into smaller pieces called slugs, and the slug plates are arranged using a software application such as the Kodak TIFF Assembler Plus, and the resulting output file is imaged to a flexographic plate. The flexographic printing plate, using current technologies is imaged (or engraved) using a specially designed flexographic imaging device and software.

After the plates have been processed via solvent or thermal processing to create a relief image, dried, and cut to size, the slug plates are manually positioned on a "carrier or mount" using double sided sticky back tape and edge sealant. After each plate has been mounted and the edge sealed, ink is applied manually using a rubber roller and an impression of the mounted plates is made on the "mounting die." This process creates a "mounters proof" or actual representation of what will be printed on press. The "carriers or mounts" are then used in a corrugated printing press to produce the finished container or point of purchase display.

Although the current workflow described above has numerous benefits, it also has two major deficiencies. Because the original composite file or film was broken into smaller pieces, correction cycles are not easily accommodated because the composite file is no longer available for reference (for position) when placing new graphics or remounting worn individual slug plates. Also, there is no ability to save the job estimate information as a template to be used during production. Thus eliminating subjective decision, which will ensure that job costs are in alignment with the estimate/quote that is made at the beginning of the workflow.

In the process, prior art determining of the optimum number of slug plates versus the labor costs to mount the job is subjective. There is no embedded pricing information or analysis available to assist in the process, i.e. real time cost analysis as the work is performed.

A prior art method is described in U.S. Pat. No. 6,954,291 (Klein et al.). Klein et al. discloses reading a previously prepared output ready file such as TIFF bitmap, and automatically scanning for slug plates. The scanned slug plates are cut and pasted into a new file while minimizing the possible waste in the created new file. U.S. Pat. No. 6,954,291 does not suggest any embedded cost calculation to be reflected by the chosen geometry of the new file.

SUMMARY OF THE INVENTION

Briefly, according to one aspect of the present invention a method for reducing waste in imaging of flexographic plates comprises the steps of: receiving an electronic art file; displaying the file on a computer display; selecting a set of polygonal areas from the displayed file in response to cost calculation associated with the selection of the set of polygonal areas; automatically offering alternative polygonal areas based on automatic cost calculation analysis based on the selection of the polygonal areas; ganging the polygonal areas into a compacted slugs file; imaging the compacted slugs file on a flexographic imaging device to produce compacted flexographic plate; cutting the compacted flexographic plate according to the selection the polygonal areas into independent flexographic slug plate pieces; and mounting the flexographic slug plate pieces on a carrier while matching the original structure of the electronic art file.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

The present invention describes methods of selecting scenarios for reducing flexographic plate waste, while calculating the cost associated with a selected scenario. This invention will help in reducing labor cost as well as material waste in the process of flexographic plate production.

Figure 1:
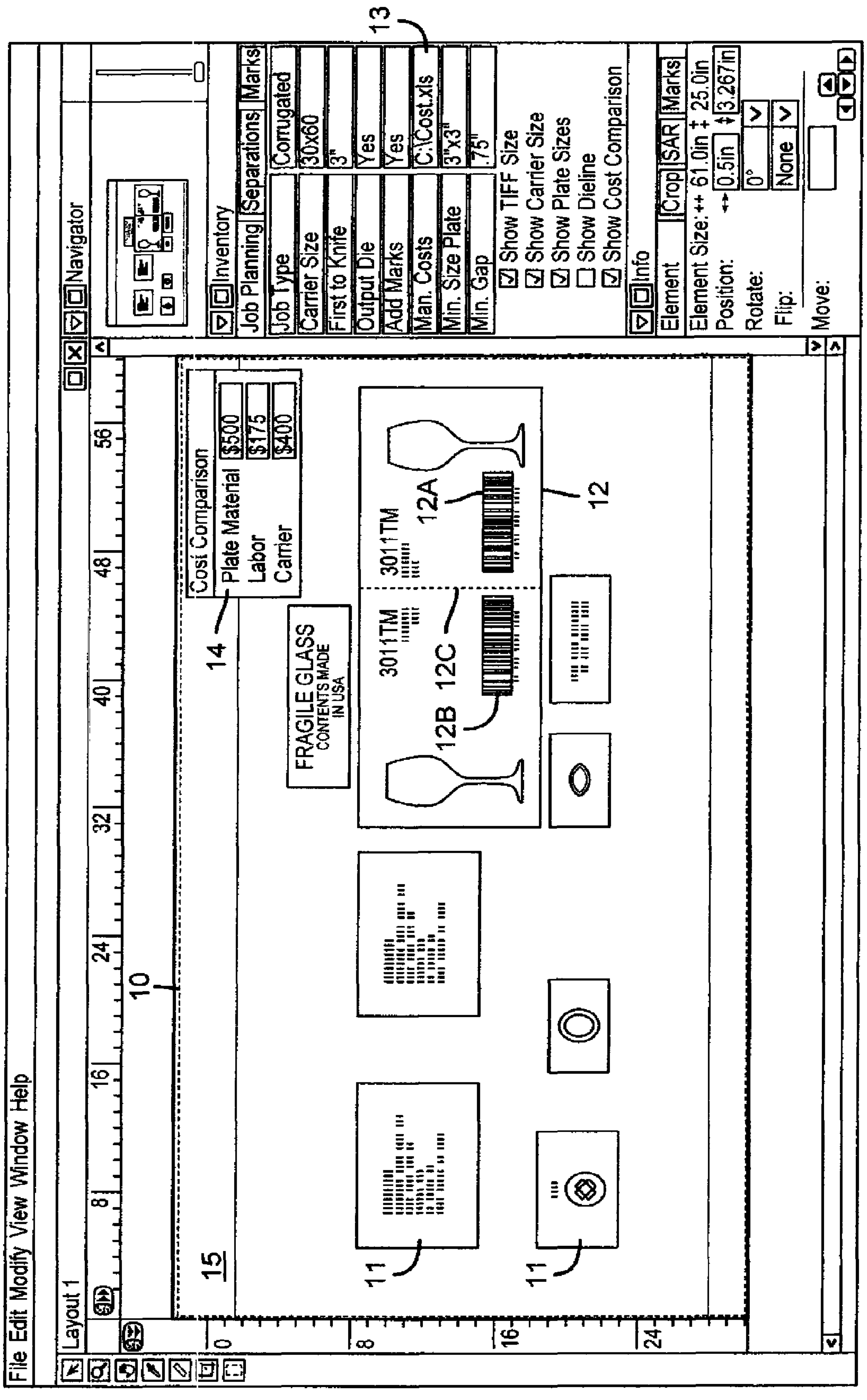
FIG. 1 is a schematic illustrating the selection of slug plates with automatic indication of associated cost.

Referring to FIG. 1, digital image, e.g. in TIFF bitmap format, represents the electronic art file 10, which is displayed on a computer screen. An enclosing rectangle 15 to indicate the carrier size will be displayed along with a guide to indicate the "first to knife" position off the die shape to the carrier. The user manually selects the polygonal shaped slugs 11 from electronic art file 10, which later on in the process will be broken or cut into separate slug plates. The slugs selection is illustrated for the purpose of an example, by the independent slugs 11 or by a combined slug 12. The combined slug will include more than one image, whereas the independent slugs 11 will include a single image each. The user might create a combined slug 12, usually in cases where the images that are forming the combined slug 12 are positioned in proximity to each other. Slug 12 illustrates an example of a combined slug since it combines image 12A and image 12B, which are positioned close to each other. (A single slug plate 210 will be prepared later on in the process reflecting combined slug 12.) In the case of a combined slug, images 12A and 12B will be separated after printing along the separation line 12C.

At each event that the user selects a new independent slug 11 or alters the slug selection, the cost calculator 14 will automatically calculate and display the computed cost results, to reflect changes made by the user.

The input data for the cost calculation includes:

1. Slug plate selection made by the user.
2. Specific site customized cost data is entered by the user ahead of time and saved into the cost configuration setup 13, which is specific for each printing site.

The cost configuration setup 13 includes among other parameters: fully loaded cost per square inch or mm for plates, fully loaded cost per square inch to manufacture each carrier, and fully loaded costs "per mount" to position and edge sealed slug plates. Thus, the invention helps the user reach the most cost effective slugs selection that is optimized to his or her specific needs, taking into account parameters such as plate cost, cost of labor, and other relevant cost related parameters.

In another embodiment of this invention, after a selection of slug plates is made by the user, automatic analysis is done to look for adjacent selected slug plates areas. The results of such analysis will be an automatic suggestion of possible combinations of adjacent areas to form a new set of slug plates, provided that the instant cost calculator 14 found that the new set of slug plates will be less expensive to produce.

Figure 2:
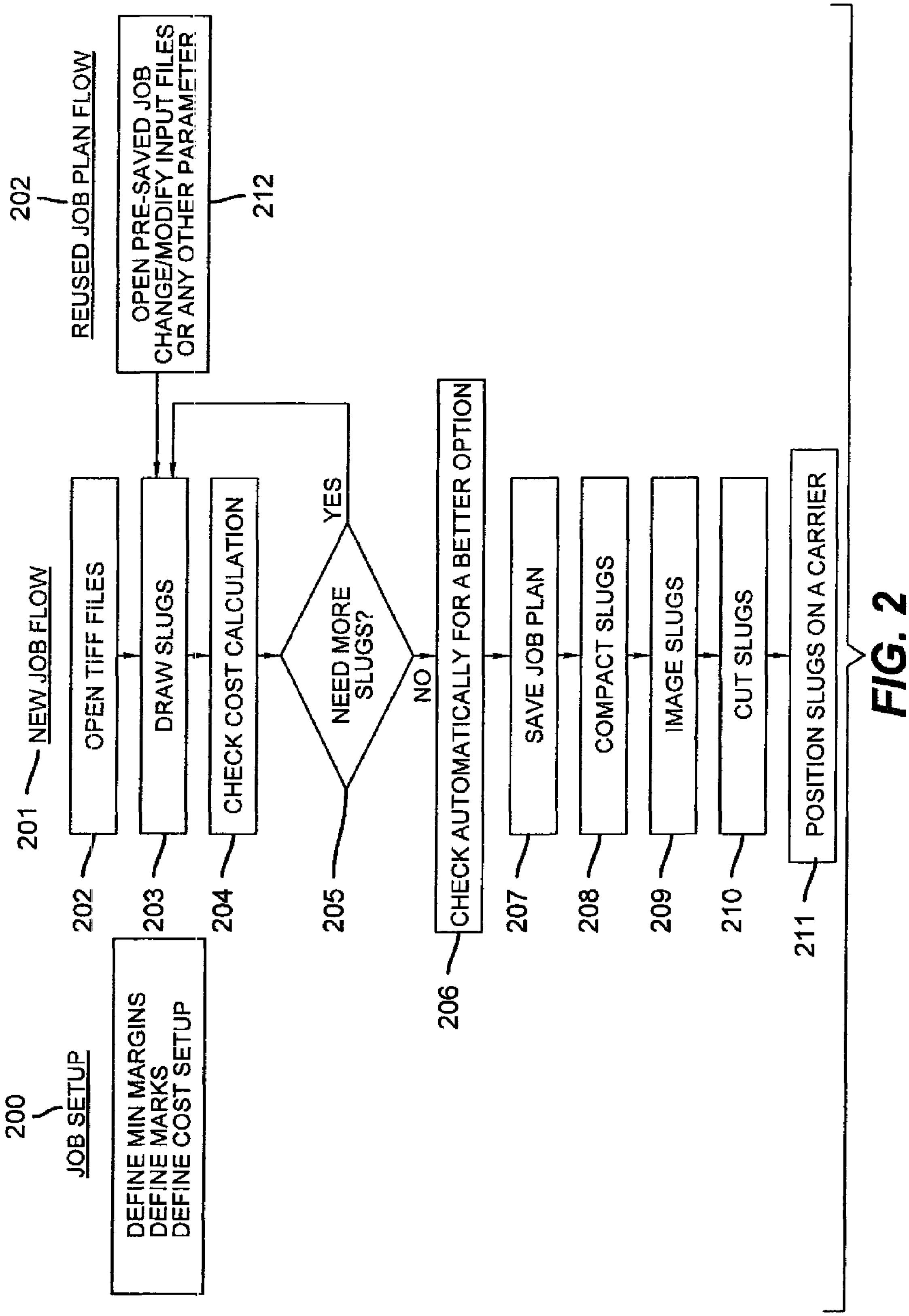
FIG. 2 is a block diagram illustrating the complete slug plates workflow.
Figure 3:
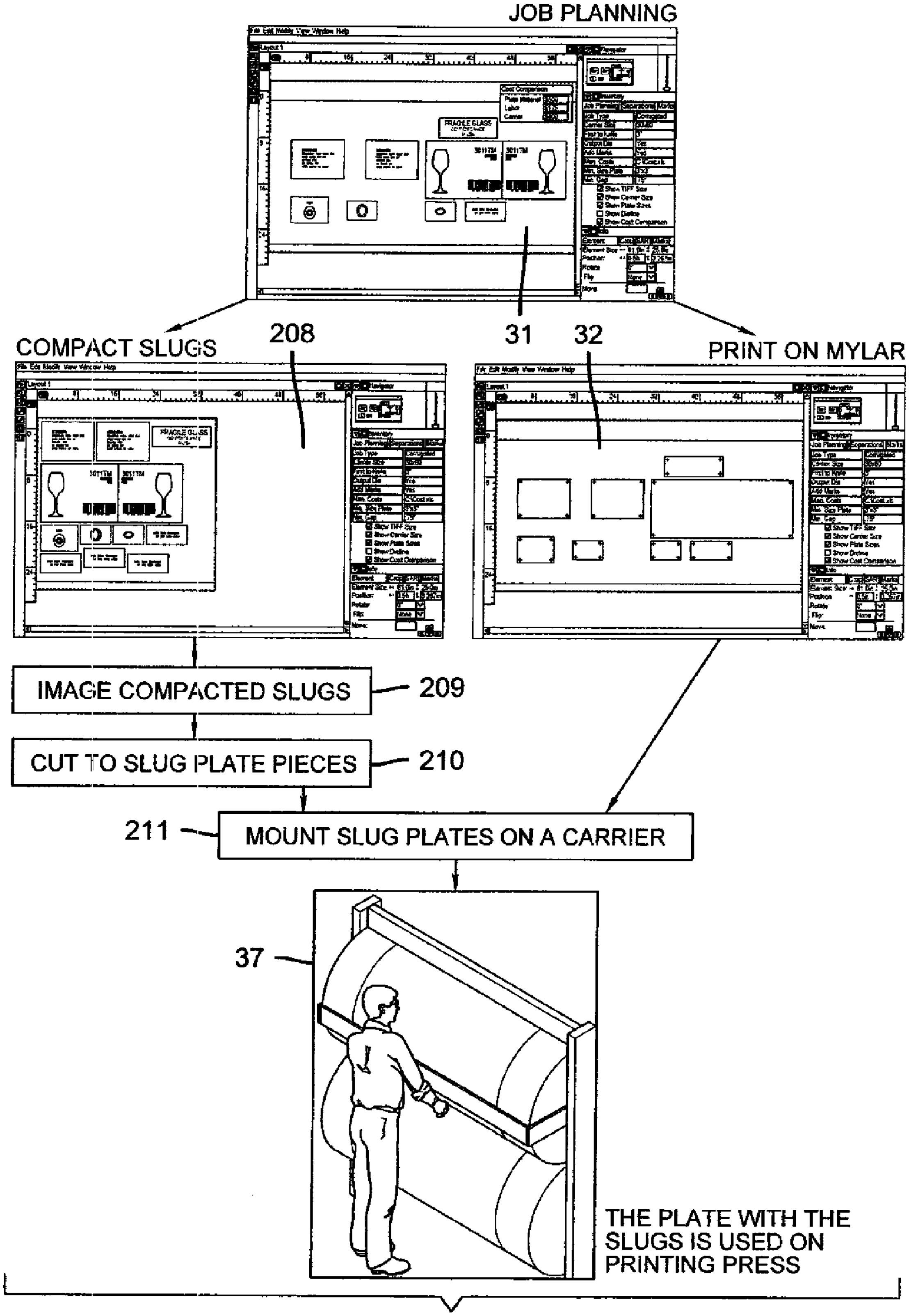
FIG. 3 is schematic illustrating the complete slug workflow.

In order to better the invention, reference is made to FIG. 2 and FIG. 3. The user can select to add marks to each slug. The type of marks can be set by the user. Upon completion of this step, the user will output a mounting die 32 to an inkjet device, filmsetter or plotting table. Upon finalizing the slug definition the user will select the option to compact the selected slugs to produce compact slugs 208. The user can gang the slugs manually or allow the software to gang them automatically. The resulting compact slugs 208 will be imaged on an imaging device.

Figure 4:
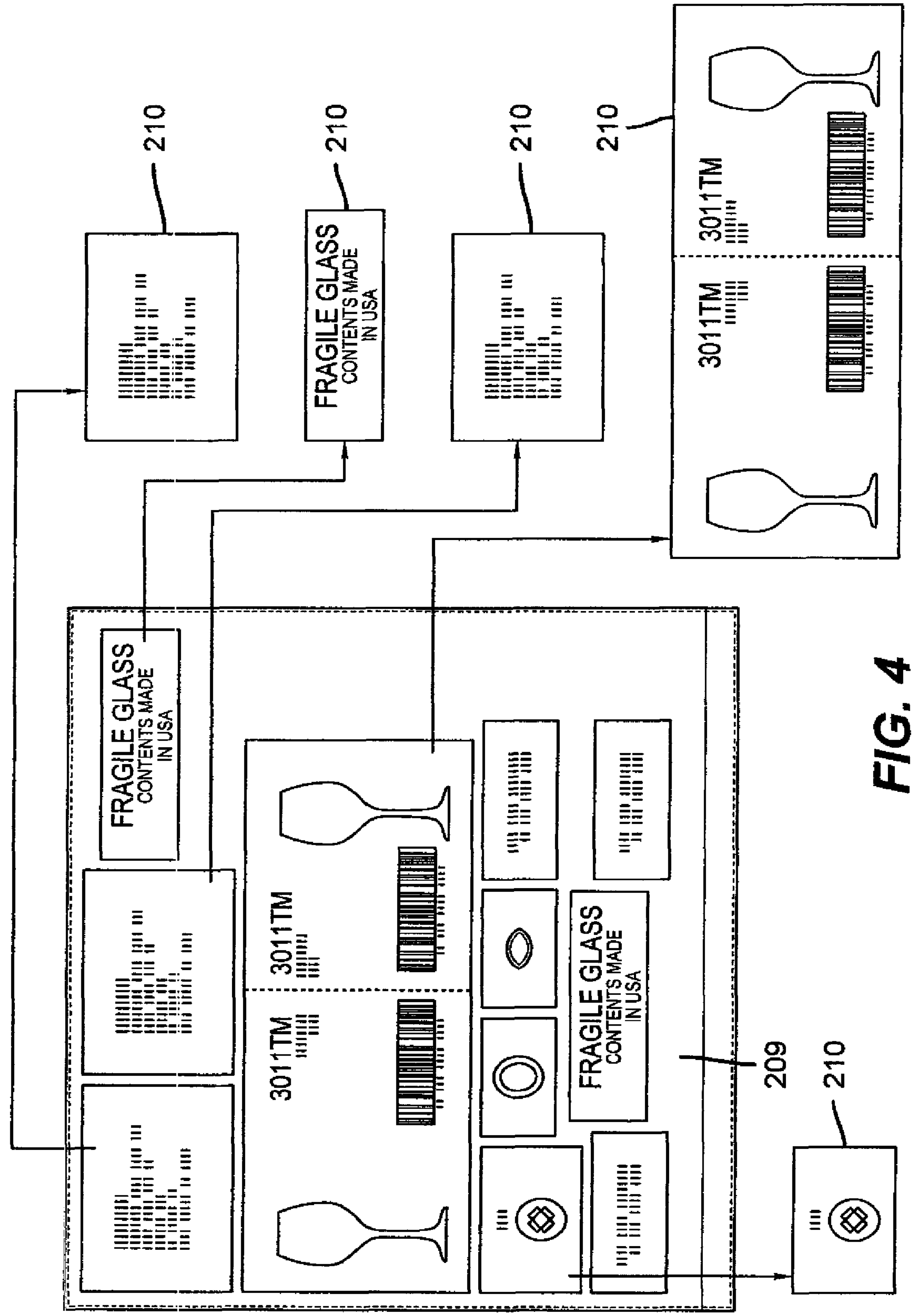
FIG. 4 is schematic illustrating cutting independent slug plates from compacted plate.

After the plate exposure and development processes, the user can choose to use a plate cutting device (such as from exact-technology) in order to cut the compacted slug plate 209 into separate slug plates 210. Previously generated cutting instruction file will be supplied to the cutting device and it will start the automatic plate cutting process. The user may also choose to cut the compacted slug plate 209 manually into a plurality of slug plates 210, as illustrated in FIG. 4. The slug plates 210 are then positioned on to a carrier surface 211 using double sided sticky tape and edge sealant. The populated carrier surface will later be mounted on a printing device for printing 37.

Printing sites often tend to execute similar jobs from time to time. This is usually apparent when specific customers order same or similar jobs, such as a popular product package. The ability to reuse a previous definition of a job will save work time and prevent new mistakes and the need to define the same job again and again. Therefore, previously designed and saved jobs 212, can be recalled to be modified and/or reused in the future.

A job setup process 200 is performed to setup general parameters such as typical site cost scheme in a form of a cost file. In addition, parameters such in minimal margins and marks are entered. Usually these parameters are modified frequently, not per every slug plate job.

The steps of a new job flow 201 will be described hereunder. A digital plate file 202 typically a TIFF bitmap file comprising plurality of plate pieces is displayed. As part of job planning 31, the user draws 203 certain slugs e.g. 11 and/or 12 to represent desired plate pieces to be generated. A cost calculation 204 is made to represent the slugs drawing. The user might decide to draw more slugs 205, in this case steps 203 and 204 are redone. At the stage the user finishes steps 203 and 204, an automatic step 206 for calculating a better slug plate option that might be more cost effective, may be performed by the software. At this stage the job planning 31 is completed, resulting in two outcomes:

1. A finished job plan 207 is ready and is being saved.
2. The geometry of the job plan is printed on a mounting die 32 for further mounting slug plates 210 on carrier 211.

The next step is to compress the previously selected slugs resulted from job planning 31 into a better optimized layout geometry, resulting in compacted slugs area 208.

The compacted slugs 208 are imaged to produce compact slug plate 209. Slug plates are cut from the previously imaged compacted slug plate 209 into independent slug plate pieces 210.

Figure 5:
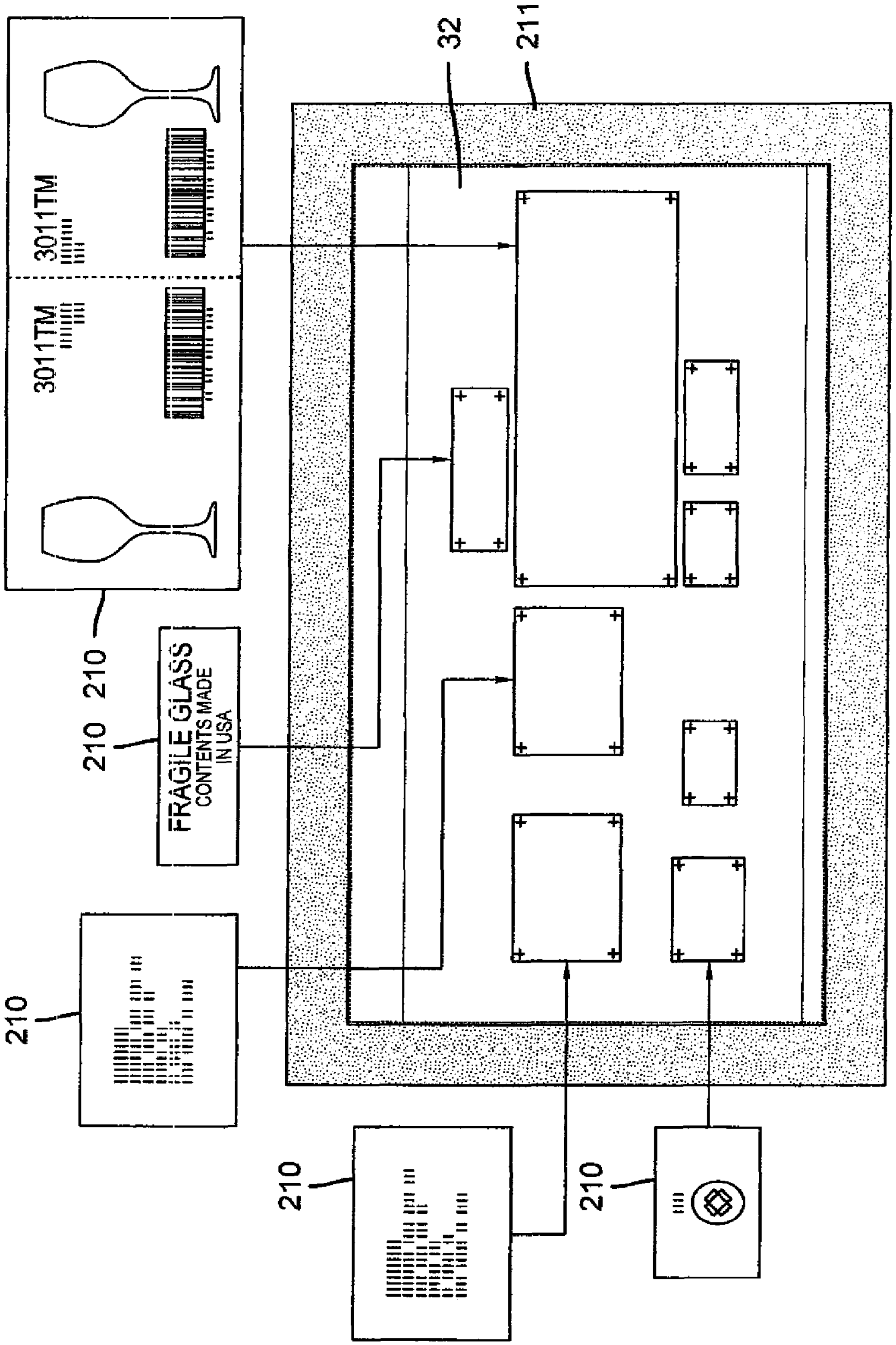
FIG. 5 is schematic illustrating mounting slug plates on carrier according to the mounting die location.

Reference is made to FIG. 5, wherein the cut slug plates 210 are positioned on to a carrier surface 211 using double sided sticky tape and edge sealant, and the slugs are placed on the carrier 211. The exact positioning of slug plates 210 on carrier 211 is assisted by the previously prepared job planning 31 geometry printed on a transparent mounting die 32. Finally, the populated carrier surface 211 is mounted on a printing press 37 for printing.

Another embodiment of the present invention incorporates a reused job plan flow 202. A previously prepared job is opened and a required modification are made. At this stage the flow continues from steps 203 to 211 as has been described for the new job flow 201.

The invention has been described in detail with particular reference to certain preferred embodiments thereof, but it will be understood that variations and modifications can be effected within the scope of the invention.

PARTS LIST

10 electronic art file
11 independent slugs
12 combined slugs
12A combined image A
12B combined image B
12C separation line
13 cost configuration setup
14 instant cost calculator
15 carrier enclosing rectangle
31 job planning
32 print a mounting die on Mylar to be used on carrier
37 mount carrier on printing press
200 setup process
201 new job flow
202 reuse of previous job plan flow
203 draw slugs
204 check cost calculation
205 draw more slugs
206 automatic check of better option
207 finished job plan saved
208 compacted slugs
209 compacted slug plate
210 slug plate
211 position slugs on carrier
212 open previously saved plan job

The invention claimed is:

1. A method for reducing a cost of imaging flexographic plates by reducing waste comprising the steps of:

a) receiving an electronic art file;

b) displaying said file on a computer display;

c) selecting a set of polygonal areas from said displayed file;

d) calculating cost results associated with said selected set of polygonal areas for producing a flexographic plate wherein said cost results include cost of material and loaded labor cost reflected by said selected set of polygonal areas;

e) displaying said cost results and if said cost results are satisfactory go to step f), if results are not satisfactory go to step c);

f) ganging said selected polygonal areas into a compacted ganged file;

g) imaging said compacted ganged file on said flexographic plate; and h) cutting said compacted flexographic plate according to said selected set of polygonal areas into independent flexographic plate pieces.

2. A method as in claim 1 further comprising:

i) mounting said flexographic plate pieces on a carrier while matching the original structure of said file for imaging.

3. The method of claim 1 wherein said plate material includes at least plate material, carrier sheets, glue, Mylar film, or a combination thereof.

4. The method of claim 1 wherein said loaded labor includes at least of imaging a plate area, cutting said plate area to plate pieces, mounting said plate pieces on a carrier sheet or a combination thereof.

5. A method for reducing waste in imaging of flexographic plate by automatically calculating the associated cost of said flexographic plate comprising the steps of:

receiving a file for imaging on a flexographic imaging device;

displaying said file for imaging on a computer display;

selecting a set of polygonal areas from said file for imaging in response to a cost calculation associated with said selected set of polygonal areas for producing said flexographic plate;

automatically offering alternative polygonal areas based on automatic cost calculation analysis based on said selected polygonal areas wherein said cost calculation analysis includes cost of material and loaded labor cost reflected by said selected set of polygonal areas;

ganging said selected polygonal areas into a compacted ganged file;

imaging said compacted ganged file on said flexographic imaging device to produce compacted flexographic plate;

cutting said compacted flexographic plate according to said selected set of polygonal areas into independent flexographic plate pieces; and mounting said flexographic plate pieces on a carrier while matching the original structure of said file for imaging.

* * * * *